United States Patent
Nameche

(10) Patent No.: US 6,460,202 B1
(45) Date of Patent: Oct. 8, 2002

(54) TRANSPARENT FITTING FOR SPAS AND THE LIKE

(75) Inventor: Larry J Nameche, Plainwell, MI (US)

(73) Assignee: Sherwood-Templeton Coal Company, Inc., Indianapolis, ID (US)

( * ) Notice: Subject to any disclaimer, the term of this patent is extended or adjusted under 35 U.S.C. 154(b) by 0 days.

(21) Appl. No.: 09/707,869

(22) Filed: Nov. 7, 2000

(51) Int. Cl.$^7$ ................................................. E04H 4/12
(52) U.S. Cl. ................. 4/541.1; 4/506; 4/509; 4/493
(58) Field of Search ................. 4/541.1, 541.6, 4/492, 493, 506, 507, 509

(56) References Cited

U.S. PATENT DOCUMENTS

| | | | |
|---|---|---|---|
| 3,841,668 A | * | 10/1974 | Williams |
| 3,943,580 A | * | 3/1976 | Carter ............................ 4/493 |
| 4,416,420 A | * | 11/1983 | Thompson |
| 4,670,207 A | * | 6/1987 | Yamada et al. |
| 4,804,210 A | * | 2/1989 | Hancock |
| 5,376,717 A | * | 12/1994 | Patel et al. |

FOREIGN PATENT DOCUMENTS

JP 55-97922 * 7/1980
JP 5-10490 * 1/1993

OTHER PUBLICATIONS

Exhibit A is Dura Plastic Products, Inc. promotional material, describing clear fittings offered for sale at least as early as Nov. 6, 1999.

Exhibit B is Harvel Plastics, Inc. promotional material, describing clear fittings offered for sale at least as early as Nov. 6, 1999.

* cited by examiner

*Primary Examiner*—Charles R. Eloshway
(74) *Attorney, Agent, or Firm*—Price, Heneveld, Cooper, DeWitt & Litton

(57) ABSTRACT

A fitting for connecting to an end of tubing. The fitting includes a fitting body having a generally tubular construction with a first end adapted for leakproof connection to another component. A second end has a socket connector with tapered interior sidewall portions forming a truncated conical shape such that an end of a tube can be inserted into the socket connector and tightly wedged therein to form a leakproof seal. At least a portion of the fitting body is made of a light-transmitting material such that material lodged within the fitting body is visible from the exterior of the fitting body.

8 Claims, 2 Drawing Sheets

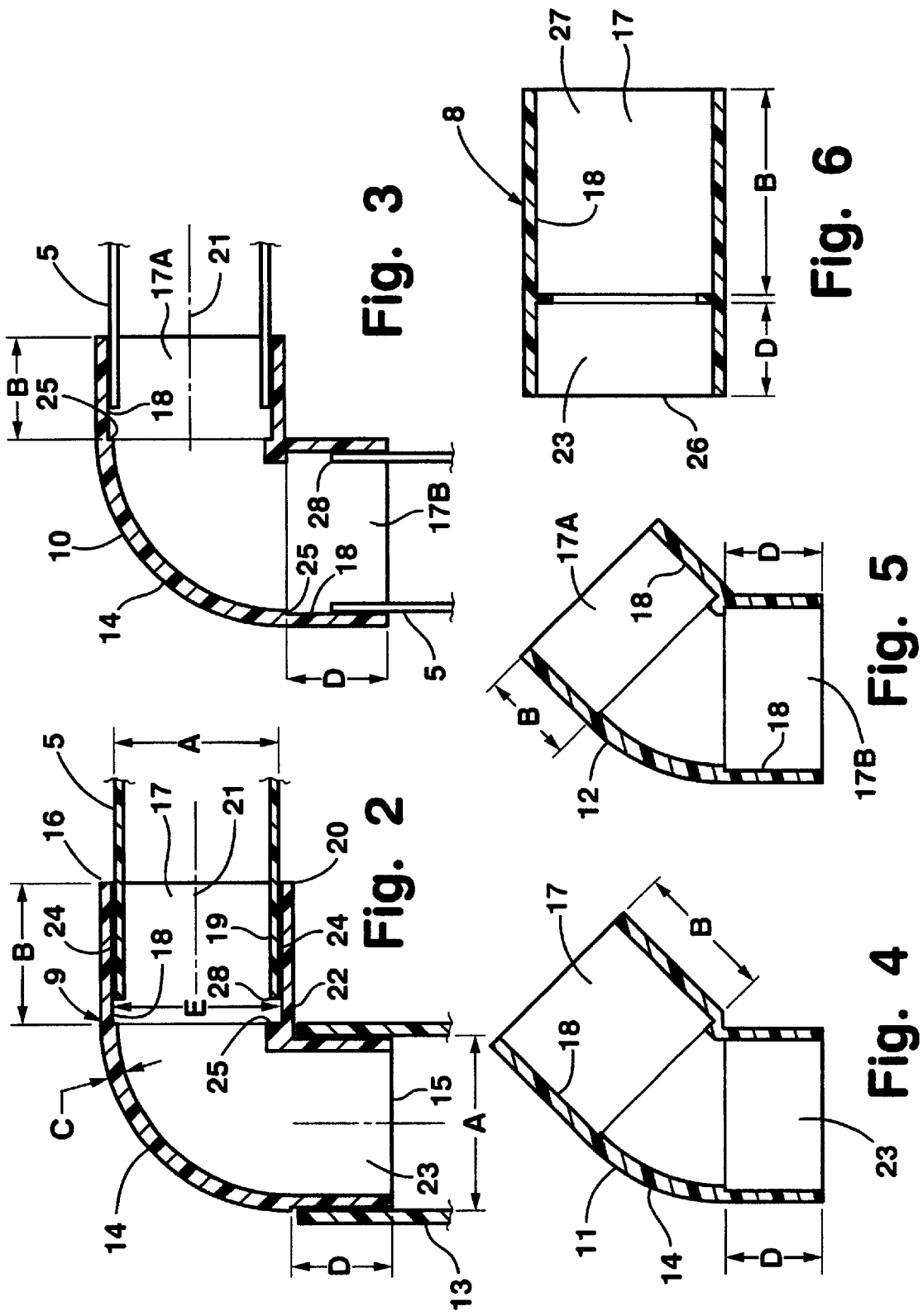

TRANSPARENT FITTING FOR SPAS AND THE LIKE

BACKGROUND OF THE INVENTION

Various spas, hot tubs, swimming pools, and waterscapes and the like have been developed. Known spas/hot tubs include a tank having sufficient size to immerse one or more occupants when filled with water. One or more jets in the tank circulate the water to promote relaxation of the individual in the tank. The jets are commonly connected to a heater that heats the water, and a pump that circulates water through the system, and supplies water to the jets in the tank. In addition to such spas/hot tubs, existing pools may also utilize a fluid recirculation system including a pump, filter, and heater. The fluid recirculation systems of spas, hot tubs, pools, and the like commonly include tubing that is connected to the heater, pump, or other component via conventional fittings. However, existing water circulation systems may suffer from various drawbacks. For example, objects or other matter may become lodged in the recirculation system, thus partially or completely blocking fluid flow through the system. Furthermore, known fittings may leak due to improper assembly or the like. Accordingly, a fitting that alleviated such drawbacks would be beneficial.

SUMMARY OF THE INVENTION

One aspect of the present invention is a fitting for connecting to an end of tubing. The fitting includes a fitting body having a generally tubular construction with a first end adapted for leakproof connection to another component. A second end has a socket connector with tapered interior sidewall portions forming a truncated conical shape such that an end of a tube can be inserted into the socket connector and tightly wedged therein to form a leakproof seal. At least a portion of the fitting body is made of a light-transmitting material such that material lodged within the fitting body is visible from the exterior of the fitting body.

Another aspect of the present invention is a spa system including a tank having sufficient size to immerse at least a substantial portion of a user when the tank is filled with water. The spa system includes a powered water pump and a flow through heater. A tubing assembly interconnects the tank, water pump, and heater to form a continuous loop capable of circulating water through the tank, heater, and pump. The tubing assembly includes a section of flexible tubing having sufficient flexibility to permit manual bending thereof without the use of tools. The tubing assembly further includes at least one fitting securing an end of the section of flexible tubing to a selected one of the pump, heater, and tank. At least a portion of the fitting is substantially transparent, such that material lodged within the fitting is visible from the exterior thereof.

Yet another aspect of the present invention is a method of detecting obstructions in a fluid circulation system of a spa. The method includes providing a spa having a tank of sufficient size to immerse at least a substantial portion of a user when the tank is filled with water. The spa has a fluid circulation system including a pump and a heater. The fluid circulation system includes at least a section of tubing and a fitting connecting the section of tubing to a selected one of the tank, pump, and heater. The fitting has at least a portion thereof constructed of a light-transmitting material. The method includes actuating the pump to circulate water through the fluid circulation system, and the fitting is visually inspected to determine if an obstruction is lodged in the fitting.

These and other features, advantages, and objects of the present invention will be further understood and appreciated by those skilled in the art by reference to the following specification, claims, and appended drawings.

BRIEF DESCRIPTION OF THE DRAWINGS

FIG. 2 is a cross-sectional view of the ninety degree fitting of FIG. 1;

FIG. 3 is a cross-sectional view of another embodiment of an ninety degree fitting;

FIG. 4 is a cross-sectional view of the forty five degree fitting of FIG. 1;

FIG. 5 is a cross-sectional view of a second embodiment of the forty five degree fitting; and FIG. 6 is a cross-sectional view of the in-line fitting of FIG. 1.

DETAILED DESCRIPTION OF PREFERRED EMBODIMENT

Figure 1:
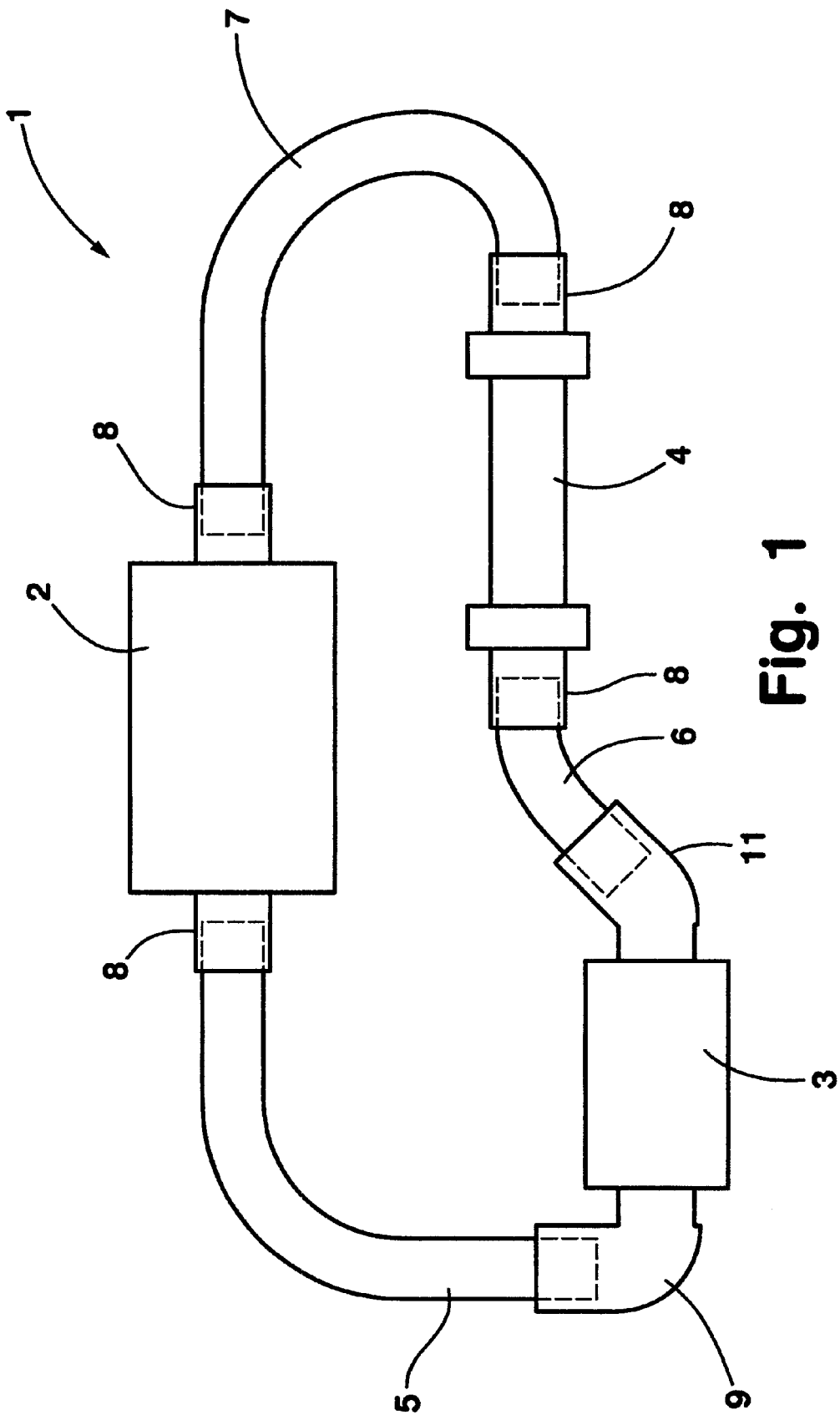
FIG. 1 is a schematic view of a spa system including transparent fittings according to the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a spa system 1 includes a tank 2 having sufficient size to immerse at least a substantial portion of a user when the tank is filled with water. The spa system 1 also includes a pump 3 and flow through heater 4. Flexible tubing sections 5, 6 and 7 are connected to the tank 2, pump 3, and heater 4 by fittings 8, 9 and 11. With further reference to FIG. 2, fitting 9 includes a fitting body 14 having a generally tubular construction with a first end 15 adapted for leakproof connection to another component such as the pump inlet/outlet 13. The second end 16 of the fitting body 14 has a socket connector 17 with tapered interior sidewalls 18 forming a truncated conical shape such that an end 19 of a flexible tube 5 can be inserted into the socket connector 17 and tightly wedged therein to form a leakproof seal. At least a portion of the fitting body 14 is made of a light-transmitting material such that material lodged within the fitting body 14 is visible from the exterior of the fitting body 14.

The spa or hot tub 1 of FIG. 1 includes a commercially available tank 2 that is of a known, conventional construction, including water jets to agitate the water within the tank 2. The pump 3 and heater 4 are also commercially available units having a conventional construction known in the spa/hot tub field. Although, the transparent fittings of the present application are illustrated in conjunction with a spa/hot tub system, the fittings may be utilized in a wide range of applications, including pools, waterscapes, irrigation systems, or other applications wherein visual inspection for obstructions in the fittings is beneficial. The flexible tubing sections 5, 6 and 7 are of a known construction, such as polyvinyl chloride (PVC), AQUA-FLEX hose available from Tektube Inc. of Las Vegas, Nev. In the illustrated example, the flexible tubing has a nominal diameter of 2 inches, with an actual outside diameter of 2.375 inches, and may bend to a radius of about 6 inches.

The fitting body 14 is made of a "virgin" pure PVC material that is substantially transparent. In the example illustrated in FIG. 2, the socket connector 17 has a diameter "A" of 2.387 inches at the edge 20 of the socket 17. The sidewall 18 tapers at about one degree relative to the axis 21 of socket 17, such that the diameter "E" at the inner end 22 of socket 17 is less than the outer diameter of the flexible tubing 5. Although a taper angle of about one degree is presently preferred, it is anticipated that sidewall 18 could taper at angles of, for example, two degrees, three degrees, or greater. Also, it is anticipated that the sidewall 18 could taper at less than one degree, such as one half of a degree, and the depth "B" of socket 17 could be made greater to ensure a proper, tight interference fit. The socket connectors 17 terminate at an annular edge or wall 25 that excessive insertion of the tubing 5. When assembled, edge 28 of tube 5 is preferably directly adjacent, or abutting annular ridge or wall 25. In the illustrated example, the socket connector 17 has a depth "B" of 1.156 inches, and the sidewall "C" of the fitting is in the range of 0.154 to 0.198 inches. A standard socket 23 has a depth "D" of 2.450 inches and fits into an inlet or outlet 13 of a pump 3 or heater 4, or other component. Because socket 23 is of a conventional design, it will not be described in detail herein. A thin layer of colored adhesive 24 is disposed between the tube 5 and the sidewall 18 of the socket connector 17, and secures the flexible tubing 5 to the fitting body 14, and also provides a sealed, leakproof connection. The transparency of the fitting body 14 permits the assembler to visually inspect the joint after assembly to ensure that the colored adhesive 24 is fully distributed between the sidewall 18 and the tube 5 to ensure that a proper connection has been made. A variety of commercially available adhesives may be utilized. For example, CPVC primer and glue adhesive, available from Instant Plastics Systems Co. of Gardena, Calif. includes a green coloring agent and provides a leakproof joint. Because the sidewalls 18 of socket 17 taper inwardly to a dimension "E" that is smaller than the outer diameter of the tubing 5, the tubing 5 is tightly wedged in the socket 17 during assembly, thereby forming a tight interference fit. In a preferred embodiment, the angle of taper of sidewalls 18 is about one degree. This angle permits manual insertion of tube 5, without the use of tools, while also providing sufficient interference to form a tight, leakproof seal.

With reference to FIG. 3, a second embodiment of the ninety degree fitting of FIG. 2 includes a pair of tapered socket connectors 17A and 17B, such that two sections of flexible tubing 5 can be joined at a ninety degree angle relative to one another. The socket connectors 17A and 17B have substantially the same dimensions as illustrated in FIG. 2, except that socket 17A has a depth "B" of 1.156 inches, and socket 17b has a depth "D" of 2.450 inches.

The fitting 11 of FIG. 4 is substantially the same as the fitting illustrated in FIG. 2, except that the sockets 17 and 23 form a forty five degree angle relative to one another. Tapered socket connector 17 and conventional or standard socket 23 permit connection of flex tubing to a component such as pump 3 or heater 4 at a forty five degree angle. The tapered socket connector 17 of fitting 11 has a depth "B" of 2.450 inches, and socket 23 has a depth "D" of 1.156 inches. A second embodiment of the forty five degree fitting is illustrated in FIG. 5. The second embodiment 12 of the forty five degree fitting includes a pair of tapered socket connectors 17A and 17B to permit connection of sections of flexible tubing at forty five degrees relative to one another. Socket 17A has a depth "B" of 1.156 inches, and socket 17B has a depth "D" of 2.450 inches. The in-line fitting 8 of FIG. 6 includes a standard socket 23 at a first end 26 having a depth "D" of 1.156 inches, and a tapered socket 17 at a second end 27 having a depth "B" of 2.450 inches. In the illustrated example, the socket connector 17 of the in-line fitting 8 has a depth "B" of 2.450 inches. The geometry of the fittings described above, including the dimensions of the sockets, is known in the spa/hot tub art. However, use of the transparent fittings described above for such applications is not believed to be known.

During assembly, colored adhesive 24 can be deposited on the end of the flex hose and/or on the tapered sidewalls 18. The end 19 of the flex tube is then inserted into socket 17 and rotated and/or shifted axially to distribute adhesive 24 if required to achieve uniform distribution of adhesive 24 on sidewalls 18 of socket 17, 17A or 17B. The fitting is then visually inspected to ensure proper distribution of the adhesive 24, and the tube is shifted as required to evenly distribute the adhesive 24.

The transparent fittings of the present invention permit visual inspection to determine if objects or other matter have become lodged in the fittings, such that the blockage can be easily located and removed.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A spa system, comprising:

a tank having sufficient size to immerse at least a substantial portion of a user when said tank is filled with water;

a powered water pump;

a flow through heater; and a tubing assembly interconnecting said tank, water pump, and heater to form a continuous loop capable of transporting water through said tank, heater, and pump, said tubing assembly including a section of flexible tubing having sufficient flexibility to permit manual bending thereof without the use of tools, said tubing assembly further including at least one fitting securing an end of said section of flexible tubing to a selected one of said pump, heater, and tank, at least a portion of said fitting being substantially transparent such that material lodged within said fitting is visible from the exterior thereof, said fitting having an opening defining a peripheral edge and a tapered socket with an annular ridge spaced apart from said peripheral edge to define a depth of at least about 2.45 inches, said tubing assembly including adhesive bonding said flexible tubing to said at least one fitting.

2. The spa system set forth in claim 1, wherein:

an end of said flexible tubing is tightly received in said tapered socket.

3. The spa system set forth in claim 2, including:

non-transparent adhesive disposed in said socket and securing said end of said flexible tubing to said fitting; and wherein:

at least a portion of said tapered socket is formed of a substantially transparent material such that said non-transparent adhesive can be visually inspected to ensure that said adhesive is properly distributed about said socket.

4. The spa system set forth in claim 3, wherein:

said flexible tubing and said fitting are both made of polyvinyl chloride such that said flexible tubing and said fitting have the same coefficient of thermal expansion.

5. The spa system set forth in claim 4, wherein:

said tapered socket defines an opening and includes sidewalls having a truncated cone shape that forms a tight interference fit with said end of said flexible tubing.

6. The spa system set forth in claim 5, wherein:

said tapered socket comprises a first tapered socket, said fitting including a second tapered socket having a depth hat is less than that of said first tapered socket.

7. The spa system set forth in claim 6, wherein:

said first and second tapered sockets define first and second axes, respectively, said first and second axes defining an angle therebetween that is less than one hundred and eighty degrees.

8. The spa system set forth in claim 7, wherein:

said tubing has an outer diameter of about 2.375 inches; and said sockets each define an inner diameter proximate said annular sidewall that is less than 2.375 inches to provide a tight interference fit with said tubing.

* * * * *